United States Patent
Clarke

(10) Patent No.: US 8,604,915 B2
(45) Date of Patent: *Dec. 10, 2013

(54) SMART POWER SOCKETS, BOARDS, AND PLUGS

(71) Applicant: International Business Machines Corporation, Armonk, NY (US)

(72) Inventor: Michael Paul Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,517

(22) Filed: Jan. 15, 2013

(65) Prior Publication Data

US 2013/0124882 A1    May 16, 2013

Related U.S. Application Data

(63) Continuation of application No. 12/948,580, filed on Nov. 17, 2010.

(51) Int. Cl.
*G08C 19/16* (2006.01)

(52) U.S. Cl.
USPC ..... 340/12.32; 700/295; 323/234; 200/51.02; 200/550

(58) Field of Classification Search
USPC .................. 340/12.32; 700/295; 323/234; 200/51.02, 550
See application file for complete search history.

(56) References Cited

U.S. PATENT DOCUMENTS

| 5,793,125 | A | 8/1998 | Tarng | 307/117 |
| 6,275,221 | B1 | 8/2001 | Song | 345/211 |
| 7,420,553 | B2 | 9/2008 | Tseng et al. | 345/213 |
| 7,661,004 | B2 | 2/2010 | May et al. | 713/323 |
| 2010/0038218 | A1* | 2/2010 | Fisher et al. | 200/51.02 |
| 2010/0050002 | A1 | 2/2010 | Huang | 713/310 |
| 2012/0053739 | A1* | 3/2012 | Brian et al. | 700/287 |

FOREIGN PATENT DOCUMENTS

| WO | WO 00/59079 A1 | 10/2000 | H01R 25/16 |
| WO | WO 2008/139215 A1 | 11/2008 | H02H 3/12 |

OTHER PUBLICATIONS

"Vampire Hunters: Devices Reduce Energy Waste," PCWorld Magazine, Aug. 25, 2010.

* cited by examiner

*Primary Examiner* — Brian Zimmerman
*Assistant Examiner* — Omer S Khan
(74) *Attorney, Agent, or Firm* — VanLeeuwen & VanLeeuwen; Jeffrey S. LaBaw

(57) ABSTRACT

An approach is provided where a smart socket receives a request over a power line and generates a request based on the received request. The second request is transmitted over a power cord connecting the smart power socket to a device. A response is received from the device and a power setting is identified therefrom. The smart socket regulates electrical current flowing from the smart power socket to the device using the identified setting. In a related approach, the device receives a power down request over a power cord from a smart power socket. The device determines whether power is still needed at the device in order to perform one or more device operations. The device then returns a response to the smart power socket, with the response indicating whether power is still needed at the device.

6 Claims, 10 Drawing Sheets

SMART POWER SOCKETS, BOARDS, AND PLUGS

TECHNICAL FIELD

The present invention relates to power sockets, power boards, and power switches that use enhanced communication over power lines to efficiently power electronic devices.

BACKGROUND OF THE INVENTION

Traditional power systems, such as found in homes and offices, waste considerable power when devices are powered on in standby mode. Traditionally, this power waste occurs when it is difficult or inconvenient to access a device's power switch. Additionally, this occurs when devices share a common power board, or power strip, with the power strip being left in a powered state because one device needs constant power even though other devices plugged into the power strip no longer require power. Traditional solutions, such as those using X10 technology, are challenged because these traditional solutions are unaware of individual device power needs and either introduce additional power-needing devices or require central-system control for operation.

SUMMARY

An approach is provided where a smart power socket receives a power request over a power line and generates a second power request based on the received power request. The second power request is transmitted over a power cord that connects the smart power socket to a device. A power response is then received from the device and a power setting is identified based on the received power response. The identification is performed by a processor included in the smart power socket. The smart power socket then regulates electrical current flowing from the smart power socket to the device using the identified power setting.

In a related corresponding approach, the device receives a power down request over a power line, with the power down request being sent from a smart power socket. The device determines whether power is still needed at the device in order to perform one or more device operations. The device then returns a response to the smart power socket, with the response indicating whether power is still needed at the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
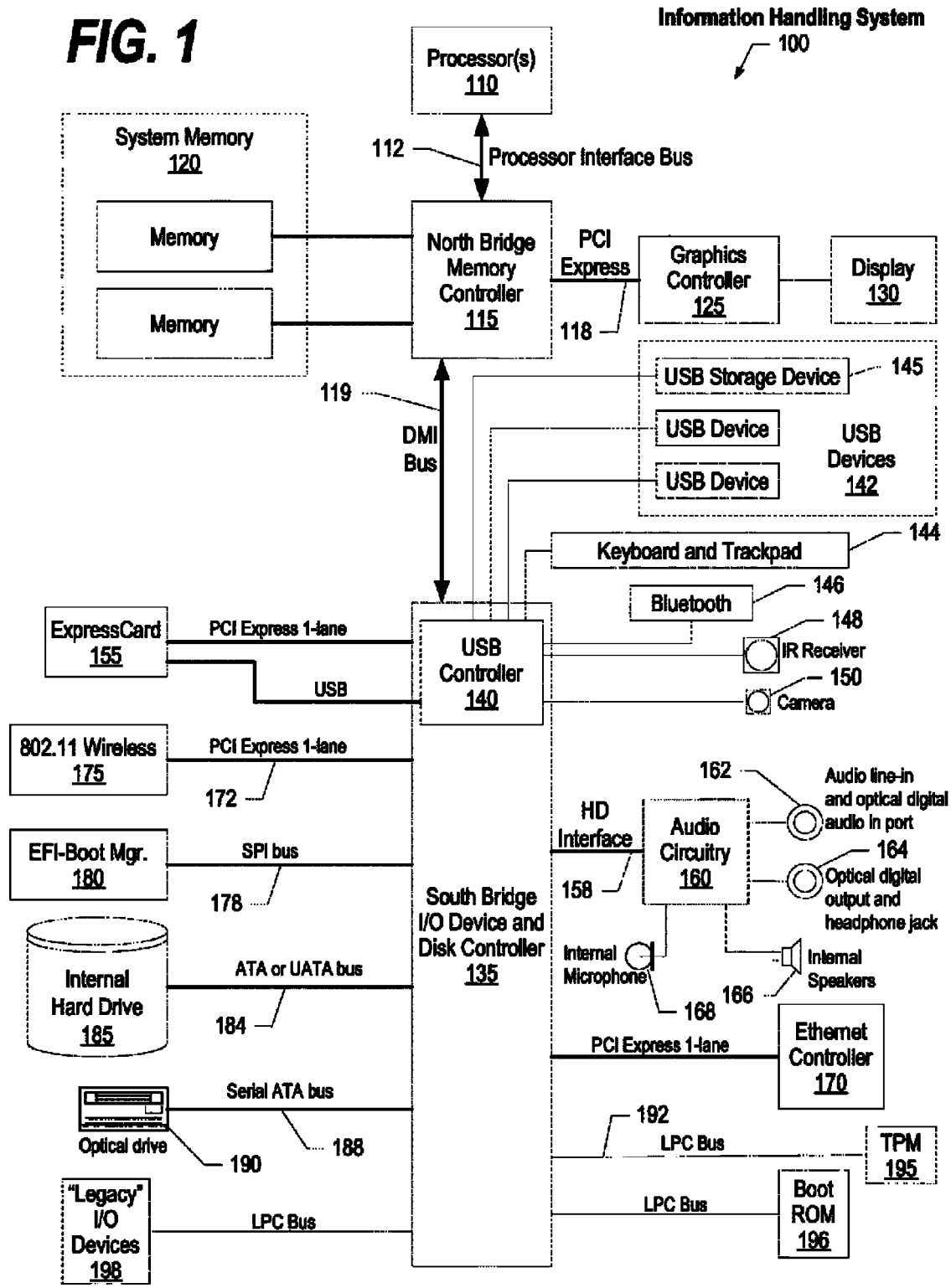
FIG. 1 is a block diagram of a data processing system in which the methods described herein can be implemented.
Figure 2:
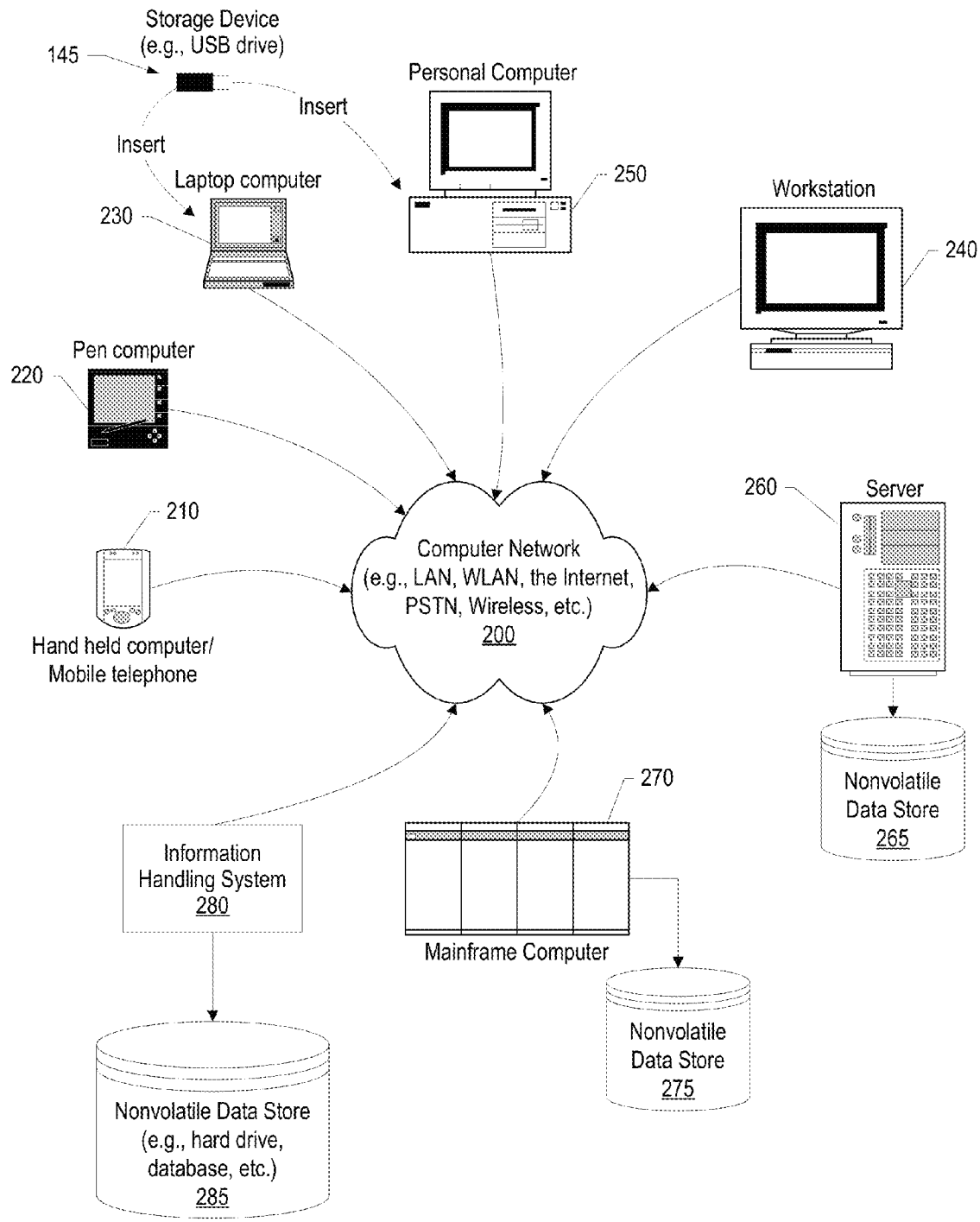
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
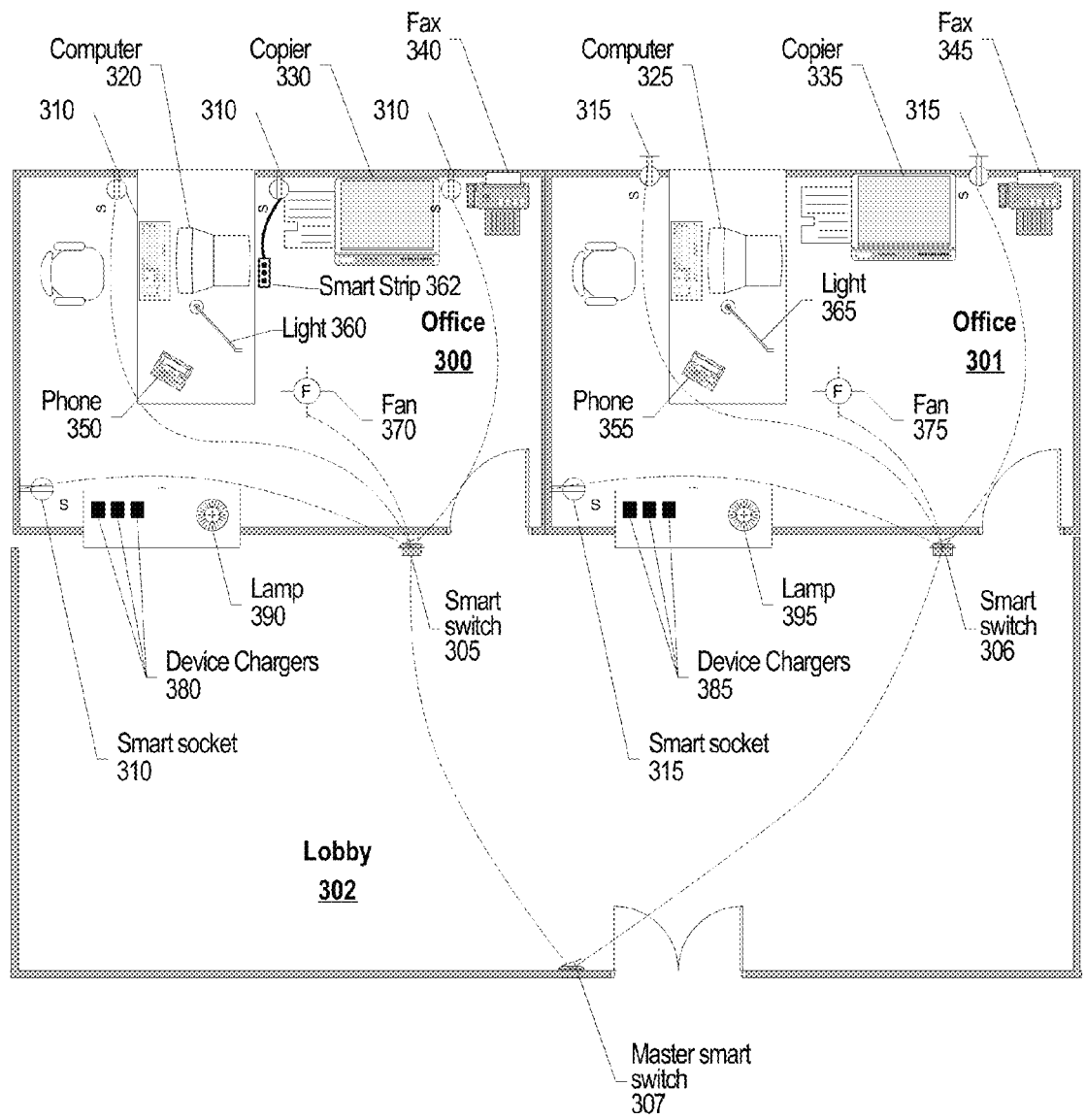
FIG. 3 is a diagram showing an office layout utilizing the smart power components described herein.

FIG. 3 is a diagram showing an office layout utilizing the smart power components described herein. Three rooms are shown in the example office diagram—offices 300 and 301, and lobby 302. Three smart power switches are also shown—smart power switches 305 and 306 in offices 300 and 301, respectively, and smart power switch 307 in lobby 302. A number of smart power sockets 310. As will be explained in greater detail herein, smart power sockets 310 (in office 300)

and 315 (in office 301) are configurable and work with the smart power switches to intelligently provide power to both smart and legacy devices. In one embodiment, a number of smart power sockets are grouped together into smart power strip 362 in order to provide electrical power. The smart power strip can be plugged into either a standard wall socket or into a smart power socket. In addition, smart power sockets can either be integrated into the wall cavity and hard-wired to power lines or can be a separate device that plugs into a standard wall socket.

Offices 300 and 301 include desktop computer systems 320 and 325, respectively. While devices such as desktop computer systems traditionally use a trickle amount of power even when the system has been shut down, using the techniques described herein, the power to these types of devices can be switched off when the system is not in use. Offices 300 and 301 also include copiers 330 and 335, respectively, fax machines 340 and 345, respectively, telephone 350 and 355, respectively, desk light 360 and 365, respectively, ceiling fans 370 and 375, respectively, device chargers (e.g., for cell phone charging, etc.) 380 and 385, respectively, and table lamps 390 and 395 respectively.

Using smart power sockets, the devices that traditionally use trickle-amounts of power can have power to the devices completely, and easily, switched off, while those devices that need to continue using power, such as desktop telephones 350 and 355, can remain in standby mode and continue receiving power in order to perform needed operations even when the office is unoccupied (e.g., telephone still rings and routes calls and/or records messages, etc.).

Figure 4:
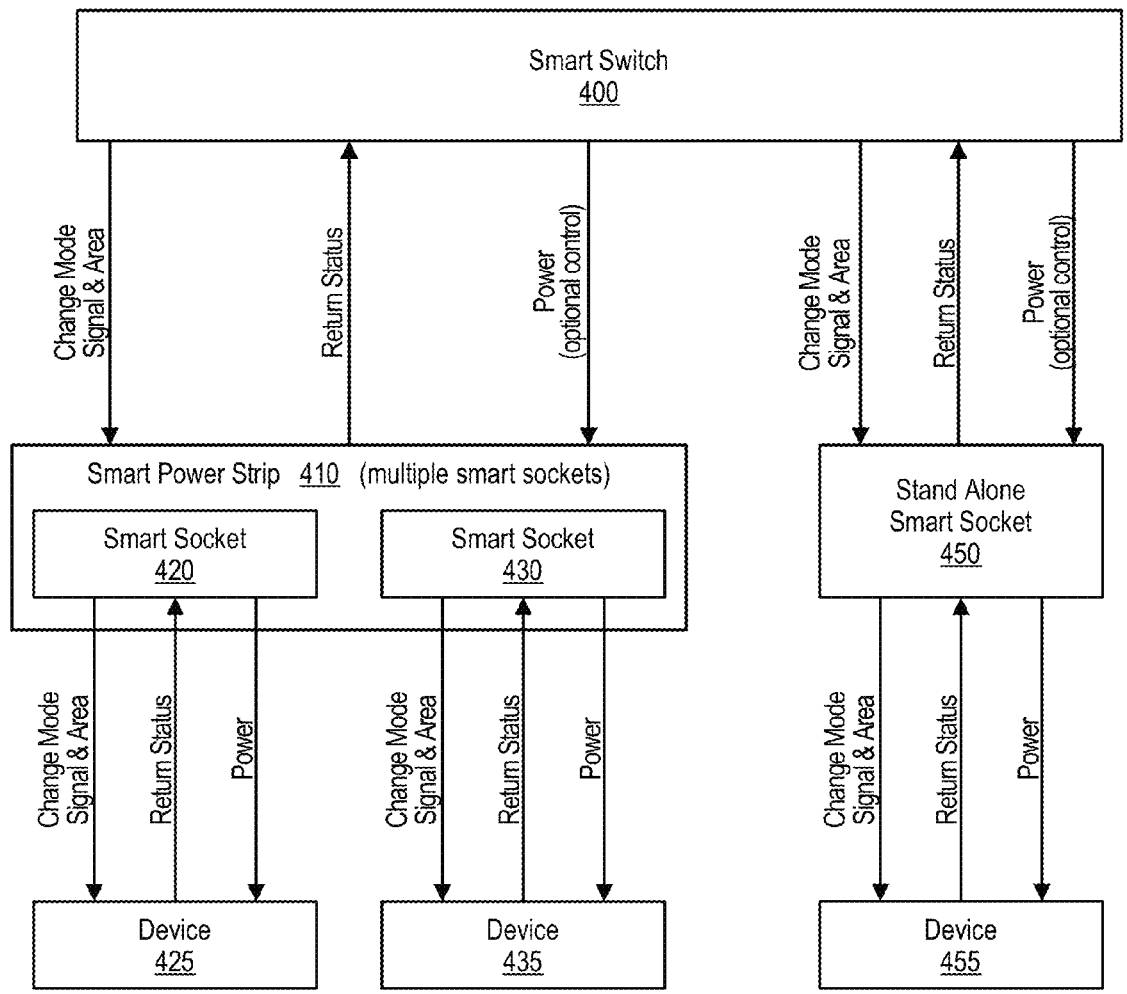
FIG. 4 is a diagram showing hierarchy between a smart switch, a smart power strip, smart power sockets, and power-consuming devices.

FIG. 4 is a diagram showing hierarchy between a smart switch, a smart power strip, smart power sockets, and power-consuming devices. Smart switch 400 (such as switches 305, 306, and 307 shown in FIG. 3) send requests through the standard power lines running from the switches to the sockets. In one embodiment, the power requests include a change mode (e.g., OFF, ON, etc.) and one or more area identifiers to which the request is directed. For example, sockets 310 in office 300 that powers desk lamp 360 and table lamp 390 can each be configured to have area identifiers that establish that the smart power socket is in office 300 as well as an area identifier that establishes that the smart power socket is providing power to a light. Likewise, sockets 310 in office 301 that powers desk lamp 365 and table lamp 395 can each be configured to have area identifiers that establish that the smart power socket is in office 301 as well as an area identifier that establishes that the smart power socket is providing power to a light. The area identifier transmitted by smart power switch 400 can identify one or more smart power sockets. For example, if the change mode is to turn the device OFF and the area identifiers are for LIGHT and OFFICE 300, then each of the lights in office 300 would be powered off. If master smart power switch (or in some embodiments, either switch 305 or 306), sends a request out to change the mode to OFF with an area identifier of LIGHT, then all of the lights in each of the offices would be turned off. Smart devices, such as the computers and other electronics, can override the request as explained in more detail below. For example, if computer 320 receives a request to turn OFF, but the computer system is currently running a critical backup operation, then the computer system can respond with a STANDBY request so that the smart power socket continues providing power until the operation is completed and the computer sends an OFF request to the smart power socket indicating that power to the computer system can be switched OFF.

As shown, smart power strip 410 includes multiple smart power sockets (420 and 430), while stand alone smart power socket 450 is directly connected to electrical power. The smart power sockets (420, 430, and 450) send requests to the devices to which they are connected (devices 425, 435, and 455, respectively). The devices respond to their smart power sockets with a power response indicating whether, for example, the device can be powered OFF or if power is still needed at the device. In addition, devices that are powered OFF can inform their respective smart power socket of future wakeup times so that the device is powered ON at a future time. For example, fax machines 340 and 345 shown in FIG. 3 may need to be turned back on in the morning in order to start receiving customer faxes even before the occupants of the offices arrive. In one embodiment, the timer functions are handled by the smart power sockets, while in another embodiment the timer functions (requests) are transmitted back to the smart power switch with the smart power switch handling the timer functions.

Figure 5:
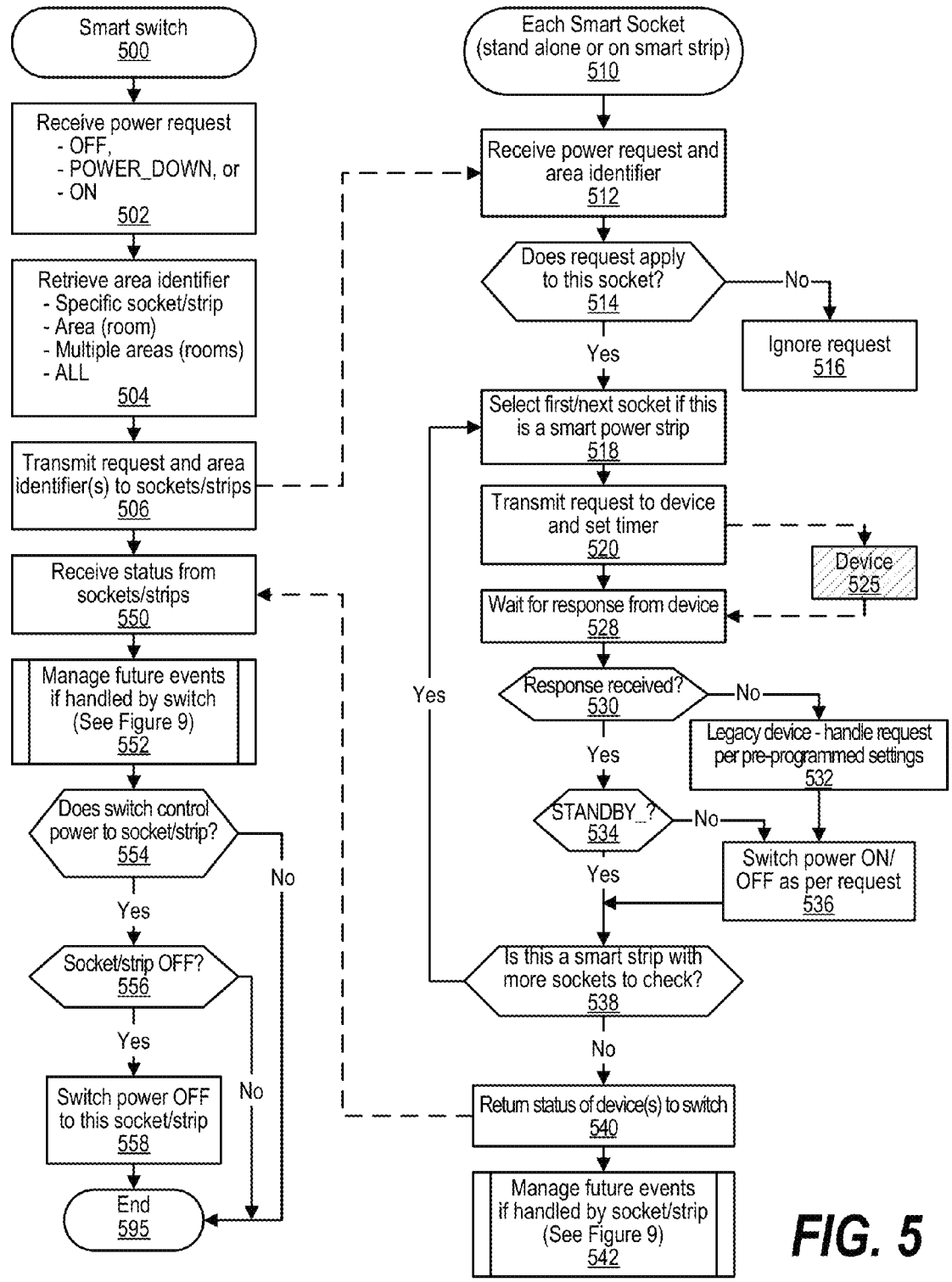
FIG. 5 is a flowchart showing steps taken by the smart switch and the smart power sockets.

FIG. 5 is a flowchart showing steps taken by the smart switch and the smart power sockets. Smart power switch processing is shown commencing at 500 while smart power socket processing is shown commencing at 510. Turning to smart power switch processing, at step 502 a power request is received at the smart power switch. A request could be to turn OFF, POWER_DOWN, turn ON, etc. At step 504, one or more area identifiers are retrieved corresponding to the request. Area identifiers can be for a particular smart power socket or smart power strip (e.g., the smart power socket that light 365 is plugged into in office 301 shown in FIG. 3). An area identifier could be for a particular logical or geographic area (e.g., OFFICE 300 in FIG. 3, all LIGHTS (360, 365, 390, 395 in FIG. 3, etc.). Multiple areas can be identified (e.g., everything in OFFICE 300 and ALL LIGHTS regardless of what room the light is in, etc.). At step 506, a request is sent through the electrical wiring using a power line carrier control signal. Similar to the technique used in X10 systems, digital data that forms the power request (requested action and, in some embodiments the area identifier) is transmitted as bursts during the relatively quiet zero crossings of the alternating current waveform. In this manner, standard electrical wiring (which is the same wiring used to power traditional devices such as lamps and appliances) is used to send the digital data. In one embodiment, one bit of data is transmitted at each zero crossing.

Figure 10:
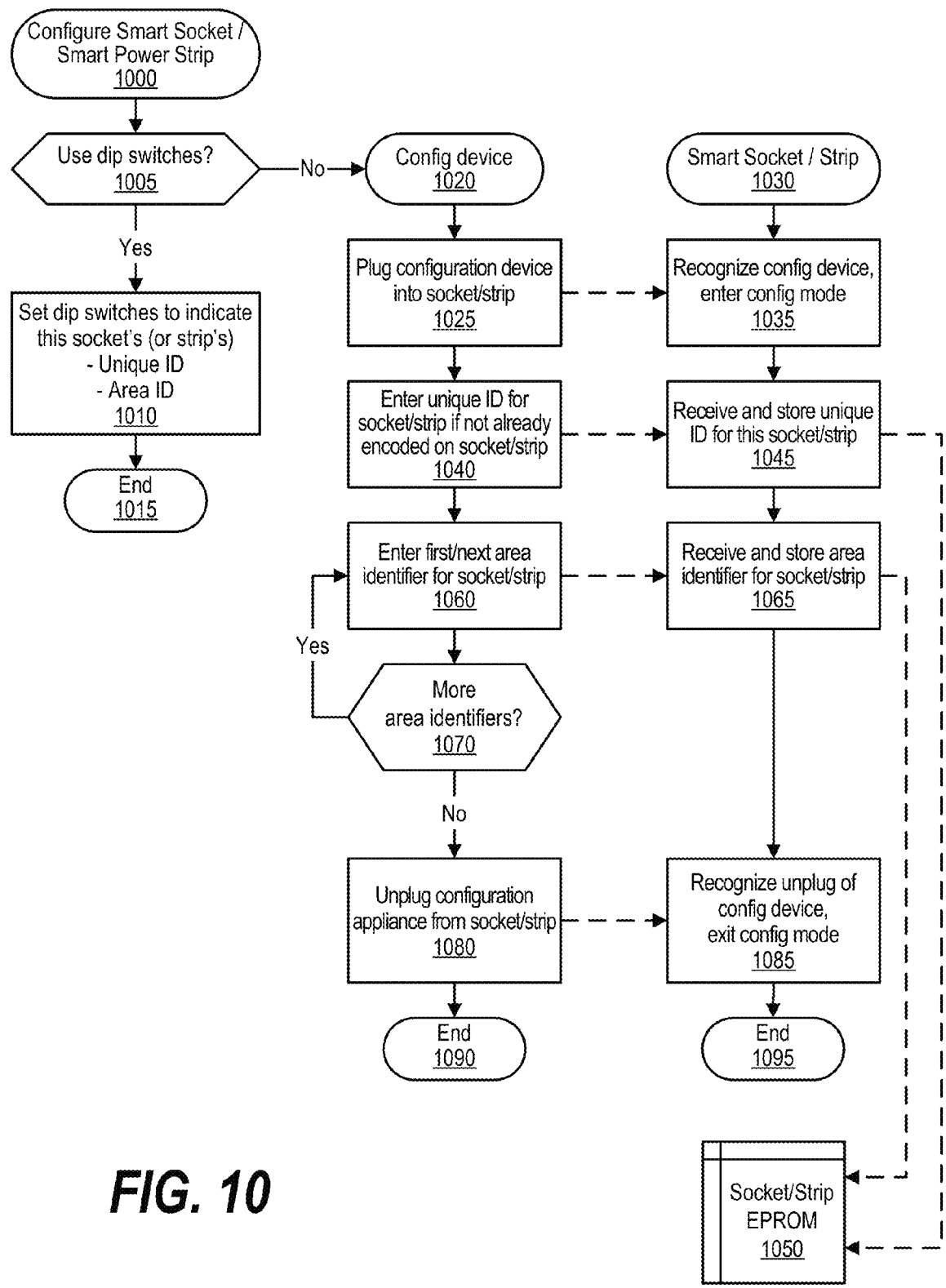
FIG. 10 is a flowchart showing steps used to configure smart power sockets, smart power strips, and devices.

Smart power socket processing commences at 510 whereupon, at step 512, each of the smart power sockets receives the power request from the smart switch with, in one embodiment, the power request including the requested action along with the area identifier. A decision is made by each smart power socket as to whether the request applies to this particular smart power socket (decision 514). Smart power socket are configured, as shown in FIG. 10 with one or more area identifiers as well as, in one embodiment, a unique identifier. If the request does not apply to this particular smart power socket, then decision 514 branches to the "no" branch and, at step 516 this smart power socket ignores the request. For example, if the request was directed at devices in OFFICE 300 in FIG. 3, but this smart power socket is located in OFFICE 301, then the request would not apply to the smart power socket. However, if the smart power socket is in OFFICE 300, then the request does apply to this smart power socket and decision 514 branches to the "yes" branch for further process.

If the receiving device is actually a smart power strip then, at step 518, the first smart power socket within smart power strip is selected. At step 520, the request is sent to device 525 (e.g., a lamp, a computer system, etc.) being powered by the smart power socket. At step 528, the smart power socket waits for a preset amount of time for a response from the device.

Smart devices designed and built with understanding of the smart power socket protocol will return a response, however legacy devices (e.g., old fashioned lamps, etc.) will not recognize the request and, consequently will not return a response. A decision is made as to whether a response was received within the time period (decision 530). If a response was not received, then decision 530 branches to the "no" branch whereupon, at step 532, the request is handled per pre-programmed settings for the device. For example, if the legacy device is a lamp, then the pre-programmed response (programmed into the smart power socket) could be to turn the lamp on/off as per the request. However, if the legacy device is a traditional telephone/answering machine, then the pre-programmed response could be to ignore the response or keep the device in STANDBY mode so that the device continues receiving power so that it can continue to operate (e.g., answer calls while the user is away). In addition, the smart power socket can be pre-programmed to recognize that a legacy device is plugged into the socket which would inhibit the socket from sending the request to the device in the first place. The switching of power on/off is performed at step 536.

Returning to decision 530, if a response is received from the device (indicating a non-legacy, or "smart" device), then decision 530 branches to the "yes" branch whereupon a decision is made as to whether the device responded with a STANDBY request, indicating that the device continues the need for electrical power (decision 534). If the device did not respond with a STANDBY request, then decision 534 branches to the "no" branch whereupon, at step 536, the smart power socket changes the power regulation to the device as indicated in the request (e.g., turns the power OFF to the device, etc.). On the other hand, if a STANDBY request was received from the device, then decision 534 branches to the "yes" branch bypassing step 536 and the smart power socket continues providing electrical power to the device.

A decision is made as to whether this smart power socket is actually a smart power strip with more smart power sockets to check (decision 538). If this is a smart power strip, then decision 538 branches to the "yes" branch which loops back to select and process the next smart power socket in the smart power strip as described above. Those skilled in the art will appreciate that steps 520 through 536 can be performed in parallel for each of the smart power sockets included in the smart power strip. If the smart power socket is a simple smart power socket and not a smart power strip, or if all of the smart power sockets included in the smart power strip have been processed, then decision 538 branches to the "no" branch whereupon, at step 540, return status of the devices (or smart power sockets) is returned to the smart power switch. As part of their response, a device may indicate a future power need so that the smart power socket will return power to the device at a future time. These future power events are processed by predefined process 542 (see FIG. 9 and corresponding text for processing details).

Returning to smart power switch processing, at step 550 the smart power switch receives status from smart power switches and smart power strips. In some embodiments, the smart power switch handles future power events to provide power to devices at a future time. In these embodiments, predefined process 552 is performed by the smart power switch rather than the smart power socket or smart power strip (see FIG. 9 and corresponding text for processing details). A decision is made as to whether the smart power socket or smart power strip is directly connected to the smart power switch (decision 554). If the smart power switch controls power to the smart power socket or smart power strip then decision 554 branches to the "yes" branch whereupon a decision is made as to whether to switch power to this smart power socket or smart power strip OFF (decision 556) based on the response(s) received from the smart power socket or smart power strip. If the smart power socket or smart power strip should be powered OFF, then decision 556 branches to the "yes" branch whereupon, at step 558 power to the smart power socket or smart power strip is switched OFF. On the other hand, if the smart power socket or smart power strip should not be turned OFF, then decision 556 branches to the "no" branch bypassing step 558. Returning to decision 554, if the smart power switch does not control power directly to the smart power socket or smart power strip, then decision 554 branches to the "no" branch bypassing both decision 556 and step 558. Smart power switch processing then ends at 595.

Figure 6:
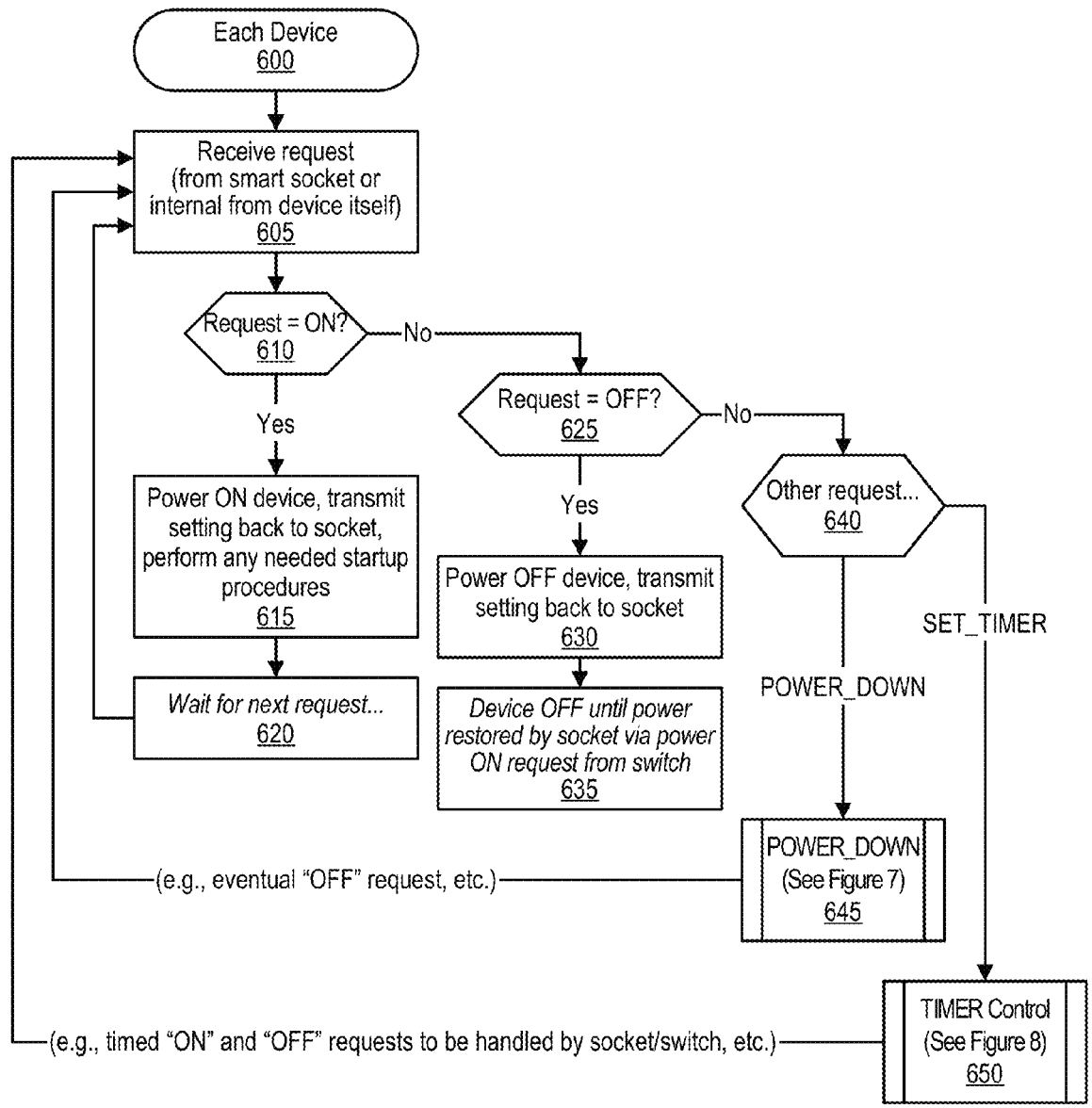
FIG. 6 is a flowchart showing steps taken by power-consuming devices that are aware of the smart power socket technology.

FIG. 6 is a flowchart showing steps taken by power-consuming devices that are aware of the smart power socket technology. Processing commences at 600 whereupon, at step 605 a request is received (e.g., from a smart power socket or a smart power socket within a smart power strip that provides power to this device). A decision is made as to whether the request is to power ON the device (decision 610). Some devices can run in a very low power setting and can be configured to receive an ON request that causes the device to full power mode. For example, similar to a "wake-on-LAN" request, a computer system can be in a sleep mode and receive an ON request from the smart power socket causing the computer system to wake up (e.g., boot, etc.). If the request is to turn the device ON, then decision 610 branches to the "yes" branch whereupon, at step 615, the device is powered ON and a response is returned to the smart power socket indicating that the device has complied with the power ON request. The device operates and, at step 620, waits for the next request to be received from the smart power socket (e.g., a POWER_DOWN request, etc.).

Returning to decision 610, if the request is not an ON request, then decision 610 branches to the "no" branch whereupon a decision is made as to whether the request is a power OFF request (decision 625). If the request is a power OFF request, then decision 625 branches to the "yes" branch whereupon, at step 630, a response is transmitted back to the smart power socket indicating that the device is complying with the device (e.g., performing any needed shutdown operations, etc.) and, at step 635 the device is powered OFF at the device. As shown in FIG. 5, the smart power socket, or in some embodiments, the smart power switch, may also switch power OFF from the socket or switch to the device.

Returning to decision 625, if the request is not a power OFF request, then decision 625 branches to the "no" branch whereupon a decision is made as to whether the request is some other request (decision 640). If the request is a POWER_DOWN request, then decision 640 branches to "POWER_DOWN" branch whereupon, at predefined process 645 the POWER_DOWN routine is performed by the device (see FIG. 7 and corresponding text for processing details). As shown, processing may eventually loop back to step 605 (e.g., when the device is finished with shutdown operations and sends an OFF request back to the smart power socket, etc.).

Figure 8:
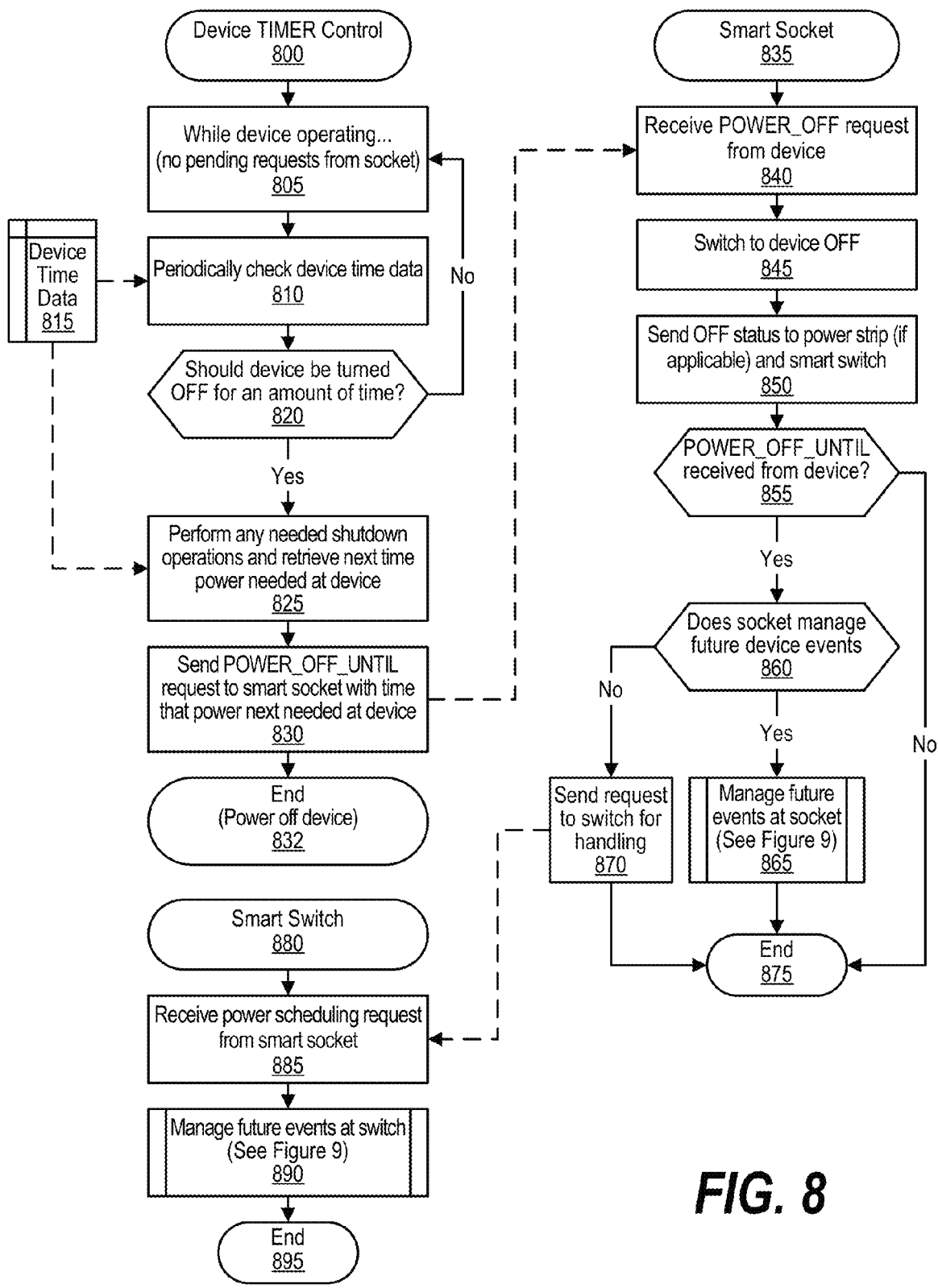
FIG. 8 is a flowchart showing steps taken device timer process, the smart power socket, and the smart switch to schedule power needs.

Returning to decision 640, if the request is a SET_TIMER request, then decision 640 branches to "SET_TIMER" branch whereupon, at predefined process 650, the timer control function is performed (see FIG. 8 and corresponding text for processing details). Again, as shown, processing may eventually loop back to step 605 for further processing (e.g., with a timed ON or OFF request being returned to the smart power socket, etc.).

Figure 7:
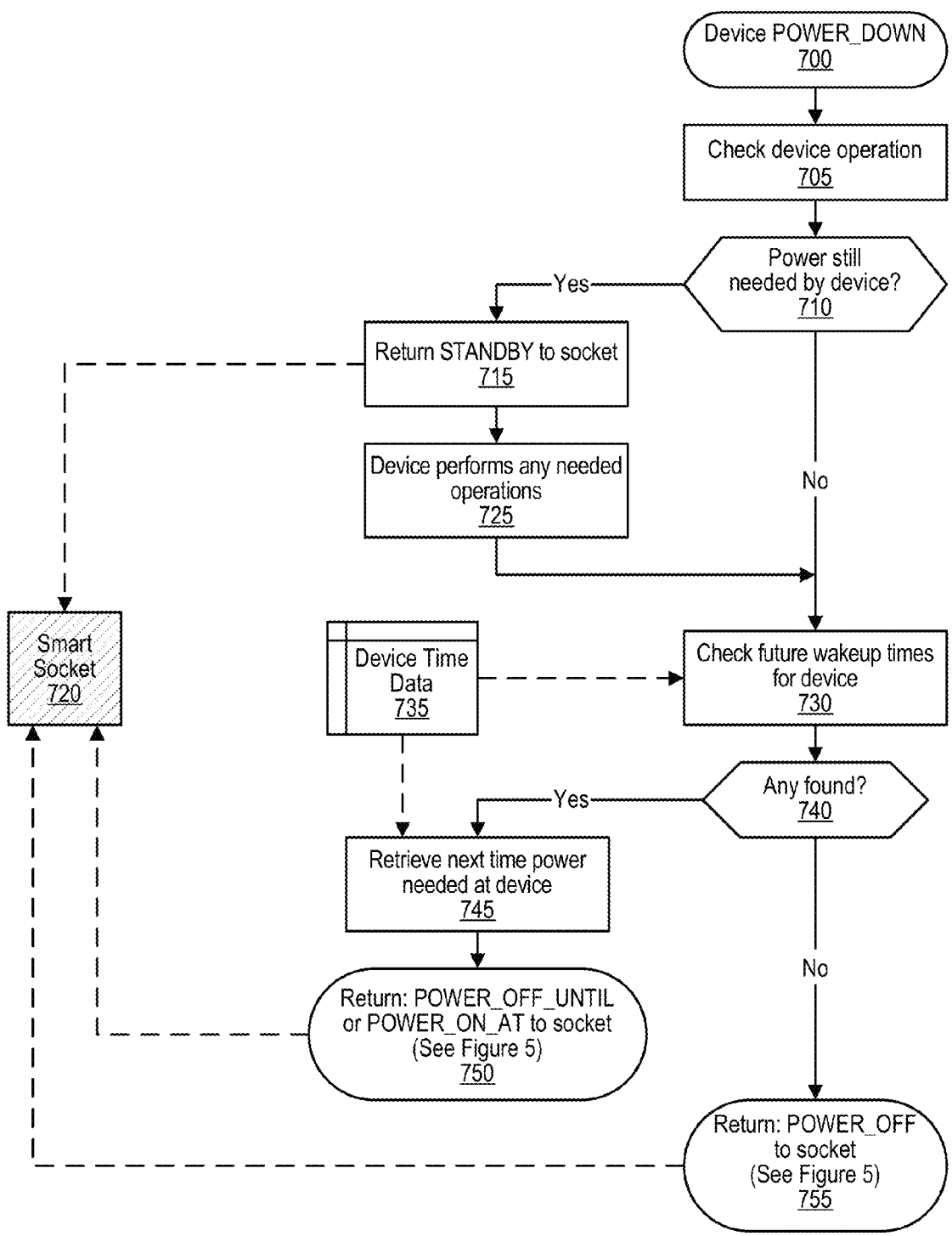
FIG. 7 is a flowchart showing steps taken by a device to manage a power down request.

FIG. 7 is a flowchart showing steps taken by a device to manage a power down request. Processing commences at 700 whereupon, at step 705 the device checks its current operation. For example, a digital video recorder (DVR) may be currently recording a broadcast and, therefore, cannot have power shut off until the recording is finished. A decision is made as to whether electrical power is still needed by the device (decision 710). If power is still needed by the device, then decision 710 branches to the "yes" branch whereupon, at step 715, a STANDBY response is returned to smart power socket 720 and, at step 725, the device continues performing any needed operations (e.g., the DVR continues recording the program until finished, etc.). Returning to decision 710, if power is no longer needed by the device, then decision 710 branches to the "no" branch bypassing steps 715 and 725.

At step 730, future wakeup times are checked by reading device time data 735. A decision is made as to whether any future wakeup times are found for the device (decision 740). Using the DVR example, after the DVR is completely powered OFF (smart power socket switches power to the DVR OFF), the DVR can inform the smart power socket of a future time (e.g. late night recording of a television program, etc.) that is scheduled for the device. A decision is made as to whether any future wakeup times were found for the device (decision 740). If any were found, then decision 740 branches to the "yes" branch whereupon, at step 745, the next time (date/time) when power is needed at the device is returned to the smart power socket. At 750, processing returns to the calling routine (see FIG. 5 and corresponding text for processing details) with the future power time setting. On the other hand, if no future wakeup times were found, then decision 740 branches to the "no" branch bypassing step 745 and, at 755, processing returns to the calling routine (see FIG. 5 and corresponding text for processing details) with an indicator that power to the device can be switched OFF by the smart power socket.

FIG. 8 is a flowchart showing steps taken device timer process, the smart power socket, and the smart switch to schedule power needs. Processing performed by the device's timer control is shown commencing at 800 whereupon, at step 805, the device is operating with no pending requests (e.g., SHUTDOWN, etc.) from the smart power socket. At step 810, the device periodically checks the device time data from memory 815. A decision is made as to whether the device should be turned off for an amount of time (decision 820). For example, a security device, such as a security light, etc. may be set to operate until a given time (e.g., 8:00 AM) and then shut off until a later time (e.g., 8:00 PM). If the device should not be turned off, then decision 820 branches to the "no" branch which loops back to continue operations. However, when a time arrives where the device should be turned off, then decision 820 branches to the "yes" branch to perform shutdown operations. At step 825, any shutdown operations that the device needs to perform before power is switched off are performed and the device checks the next time that the device should be turned ON (e.g., at 8:00 PM per previous example, etc.). At step 830, the device sends a POWER_OFF_UNTIL request to the smart power socket to which the device is connected via a standard electrical cord, and device operations end at 832.

Turning to smart power socket operations, processing commences at 835 whereupon, at step 840, the POWER_OFF_UNTIL request is received from the device via the power cord through which the smart power socket is supplying the device with power (electricity). At step 845, the smart power socket switches power to the device OFF. At step 850, the OFF status is conveyed via the electrical wiring connecting the smart power socket to the smart power switch and, if applicable, to the smart power strip if the smart power socket is part of a smart power strip. A decision is made as to whether the device has specified a wakeup time (decision 855). If the device specified a wakeup time, then decision 855 branches to the "yes" branch whereupon a decision is made as to whether the smart power socket handles future device events or if the smart power switch handles future device events (decision 860). If the smart power socket handles future device events (using a timer integrated in the smart power socket), then decision 860 branches to the "yes" branch whereupon predefined process 865 is performed to manage the future events (see FIG. 9 and corresponding text for processing details). On the other hand, if the smart power switch handles future device events, then decision 860 branches to the "no" branch whereupon, at step 870 a request is sent to the smart power switch over the electrical wiring that provides power and that connects the smart power socket to the smart power switch. The request conveys the smart power socket identifier and the wakeup time needed. Returning to decision 855, if a future wakeup time was not received from the device, then decision 855 branches to the "no" branch bypassing decision 860, predefined process 865, and step 870. Smart power socket processing of the device request ends at 875. Note that in one embodiment, a smart power strip that includes multiple smart power sockets aggregates the responses received from the various devices plugged into the various smart power sockets in order to record the times (e.g., wakeup times, etc.) for each of the devices plugged into each of the smart power sockets included in the smart power switch. The aggregated response (e.g., the next time that the smart power strip needs to perform an event) is sent to the upstream handling device, such as a smart power socket that provides power to the smart power switch or a smart power switch.

Turning to smart power switch processing, the processing performed by the smart power switch is shown commencing at 880. If the smart power switch is handling future device events then, at step 885, the smart power switch receives the power scheduling request (e.g., time/day of wakeup and smart power socket identifier, etc.). At predefined process 865, the smart power switch manages the future events (see FIG. 9 and corresponding text for processing details). At 895, smart power switch processing ends.

Figure 9:
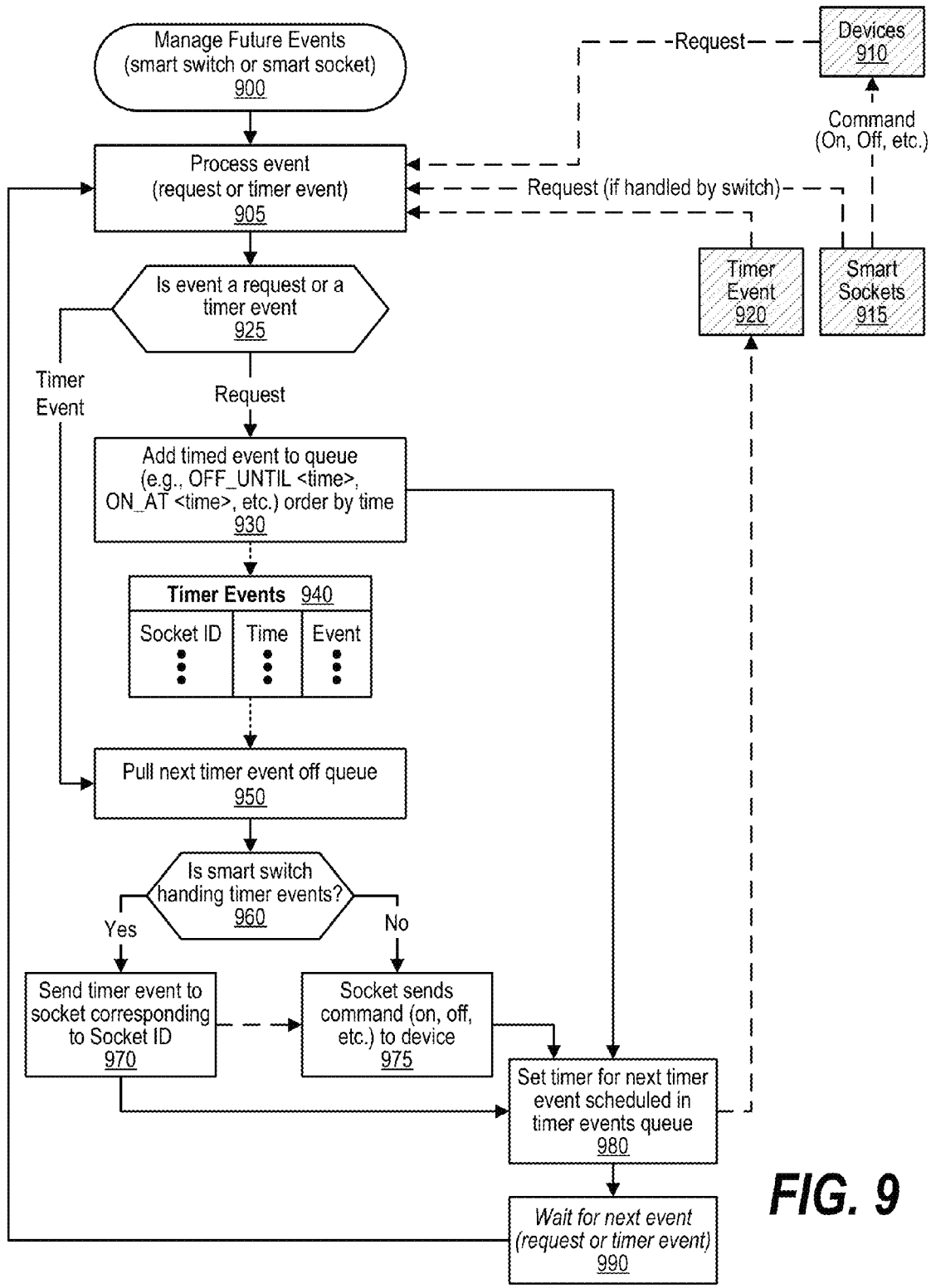
FIG. 9 is a flowchart showing steps taken to manage future power events.

FIG. 9 is a flowchart showing steps taken to manage future power events. Future events may be managed by a smart power switch or a smart power socket, depending on the chosen implementation. Processing commences at 900 whereupon, at step 905, an event is received either from another entity (device 910 making a request, a smart power socket making a request if a smart power switch is handling request)s, or a timer event previously set by the smart power switch or smart power socket. A decision is made as to whether the event is a request from another entity or is a timer event (decision 925). If the event is a request, then decision 925 branches to "request" branch whereupon, at step 930, a timed event, such as a power off time setting, a power on time setting, or the like, is added to timer events queue 940. Data that may be retained in the timer events queue could include the smart power socket identifier (if the timer events are being handled by a smart power switch), the time of the event, and the event that is to occur (e.g., power OFF, power ON, etc.). At step 980, the timer is set for the next event that is scheduled in the timer events queue and, at step 990, processing goes to sleep until either another request is received, or the timer elapses.

When the timer elapses, timer event 920 (the next scheduled timer event) occurs and is processed starting at step 905.

At decision 925, the timer event is recognized and decision 925 branches to the "timer event" branch whereupon, at step 950 the next timer event is pulled from timer events queue 940 and processed. A decision is made as to whether the device handling the timer events is a smart power switch or a smart power socket (decision 960). If the smart power switch is handling the timer events, then decision 960 branches to the "yes" branch whereupon, at step 970, the timer event data is sent through the power lines from the smart power switch in a packet that includes the smart power socket identifier. The corresponding smart power socket will recognize its identifier in the packet and process the packet by processing the request (e.g., switching power ON or OFF to the device connected to the power cord that connects the smart power socket to its device. If the smart power switch has a dedicated power line from the smart power switch to the smart power socket, then the smart power switch switches electrical power ON to the smart power socket before sending the commands. Likewise, if the smart power socket had previously switched power OFF from the smart power socket to the device, the smart power socket first switches power back ON to the device before handling the request (e.g., requesting that the device turn ON, etc.). Returning to decision 960, if the smart power socket is handling the timer events, then decision 960 branches to the "no" branch whereupon, at step 975, the smart power socket sends the request to the device (ON, OFF, etc.). As described above, the smart power socket ensures that power is flowing through the power cord to the device before sending any requests over the power cord to the device. After the timer event has been processed (either by the smart power switch or the smart power socket), processing sets the internal timer for the next event scheduled in timer events queue 940 (step 980). At step 990, processing sleeps until either the time of the next scheduled event arrives or until a request is received by another entity, at which point the event is processed as described above.

FIG. 10 is a flowchart showing steps used to configure smart power sockets, smart power strips, and devices. Processing commences at 1000 whereupon a decision is made as to whether dual in-line package (DIP) switches are used to configure the device (decision 1005). If DIP switches are used, then decision 1005 branches to the "yes" branch whereupon, at step 1010 the user positions one or more sets of DIP switches in order to provide this device (smart power socket, smart power strip, etc.) a unique identifier and also to indicate one or more areas corresponding to this device (e.g., set OFFICE_1 to 0000001, OFFICE_2 to 00000010, etc.). Configuration processing then ends at 1015.

Returning to decision 1005, if DIP switches are not being used, then decision 1005 branches to the "no" branch whereupon the smart power socket and/or smart power strip are configured using a configuration device. Configuration device processing commences at 1020 whereupon, at step 1025, the configuration device is plugged into the smart power socket (which may be included in a smart power strip). Smart power socket processing commences at 1030 whereupon, at step 1035, the smart power socket recognizes that the configuration device has been plugged into the smart power socket (e.g., the configuration device being powered and sending a unique pulse signal to the smart power socket, etc.). At step 1040, the user of the configuration device enters a unique identifier for the smart power socket or smart power strip if a unique identifier is not already encoded (hardwired) on the smart power socket or smart power strip (such as a serial number being used as the unique identifier). At step 1045, the smart power socket (or smart power strip) receives and stores the unique identifier in nonvolatile memory 1050.

At step 1060, the user enters the first area identifier that corresponds to the smart power socket. Here, the area identifiers can be assigned text tags for easier reference. For example, OFFICE_1 can be set to 00000001 and OFFICE_2 can be set to 00000010 while a logical area, such as SECURITY can be set to 10000000. If the smart power socket being configured is used to power a security light in OFFICE 2, then the user would configure the smart power socket to be in OFFICE_2 (00000010). The configuration device sends this data to the smart power socket that is being configured and, at step 1065, it receives and stores the area identifier in nonvolatile memory 1050. A decision is made as to whether there are more area identifiers to assign to the smart power socket (decision 1070). If there are more area identifiers, then decision 1070 branches to the "yes" branch. In the example above, the smart power socket is assigned to both OFFICE 2 and SECURITY, so decision 1070 would branch to the "yes" branch and repeat step 1060, this time receiving the SECURITY area from the user, which at 1065 is again received and stored by the smart power socket. This looping continues until there are no more areas to assign to the smart power socket, at which point decision 1070 branches to the "no" branch whereupon, at step 1080, the user unplugs the configuration device from the smart power socket (which may be included in a smart power strip). At step 1085, the smart power socket recognizes that the configuration device has been unplugged and exits configuration mode. Configuration processing thereafter ends at 1090 and 1095 for the configuration device and smart power socket, respectively.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    receiving, at a smart power socket, a first power request over a power line, the first power request including a requested area identifier;
    retrieving, at the smart power socket, one or more socket area identifiers corresponding to the smart power socket;
    generating, at the smart power socket, a second power request in response to at least one of the one or more retrieved socket area identifiers matching the requested area identifier of the first power request;
    transmitting, from the smart power socket, the second power request over a power cord that connects the smart power socket to a device;
    receiving, at the smart power socket, a power response from the device, the power response corresponding to the second power request transmitted from the smart power socket;
    identifying a power setting based on the received power response, the identifying performed by a processor included in the smart power socket; and
    regulating power from the smart power socket to the device using the identified power setting.

2. The method of claim 1 further comprising:
    when the second power request is transmitted to the device, setting a timer to a predetermined time amount; and
    retrieving the power setting from the memory accessible from the processor in response to the predetermined time amount elapsing before the power response is received from the device, the elapsing indicating that the device is a legacy device.

3. The method of claim 1 further comprising:
    prior to receiving the first power request:
        attaching a configuration device into the smart power socket;
        recognizing, by the smart power socket, the attachment of the configuration device;
        in response to the recognizing:
            receiving a unique socket identifier from the configuration device;
            receiving the one or more socket area identifiers from the configuration device; and
            storing the unique socket identifier and the one or more socket area identifiers in the memory.

4. The method of claim 1 wherein the power response is a delayed power off response, and wherein the method further comprises:
    retrieving a power off time setting from the received power response;
    setting a timer in a memory of the smart power socket corresponding to the power off time setting;
    identifying a completion of the timer; and
    in response to the completion of the timer, switching power off from the smart power socket to the device so that electricity no longer flows through the power cord.

5. The method of claim 1 wherein the power response includes a future power on request, and wherein the method further comprises:
    retrieving a future power on time setting from the received power response;
    setting a timer in the smart power socket corresponding to the future power on time setting;
    identifying a completion of the timer; and
    in response to the completion of the timer, switching power on from the smart power socket to the device so that electricity flows through the power cord.

6. The method of claim 1 wherein the first power request is received from a smart power switch, the method further comprising:
    identifying that the device powered by the smart power socket no longer requires electrical power;
    sending a second power response from the smart power socket to the smart power switch, wherein the smart power response indicates that the smart power socket no longer requires power; and
    switching power off from the smart power switch to the smart power socket.

* * * * *